March 11, 1930.  H. B. WOODS  1,749,792
CHECK DETECTOR
Filed Feb. 5, 1927
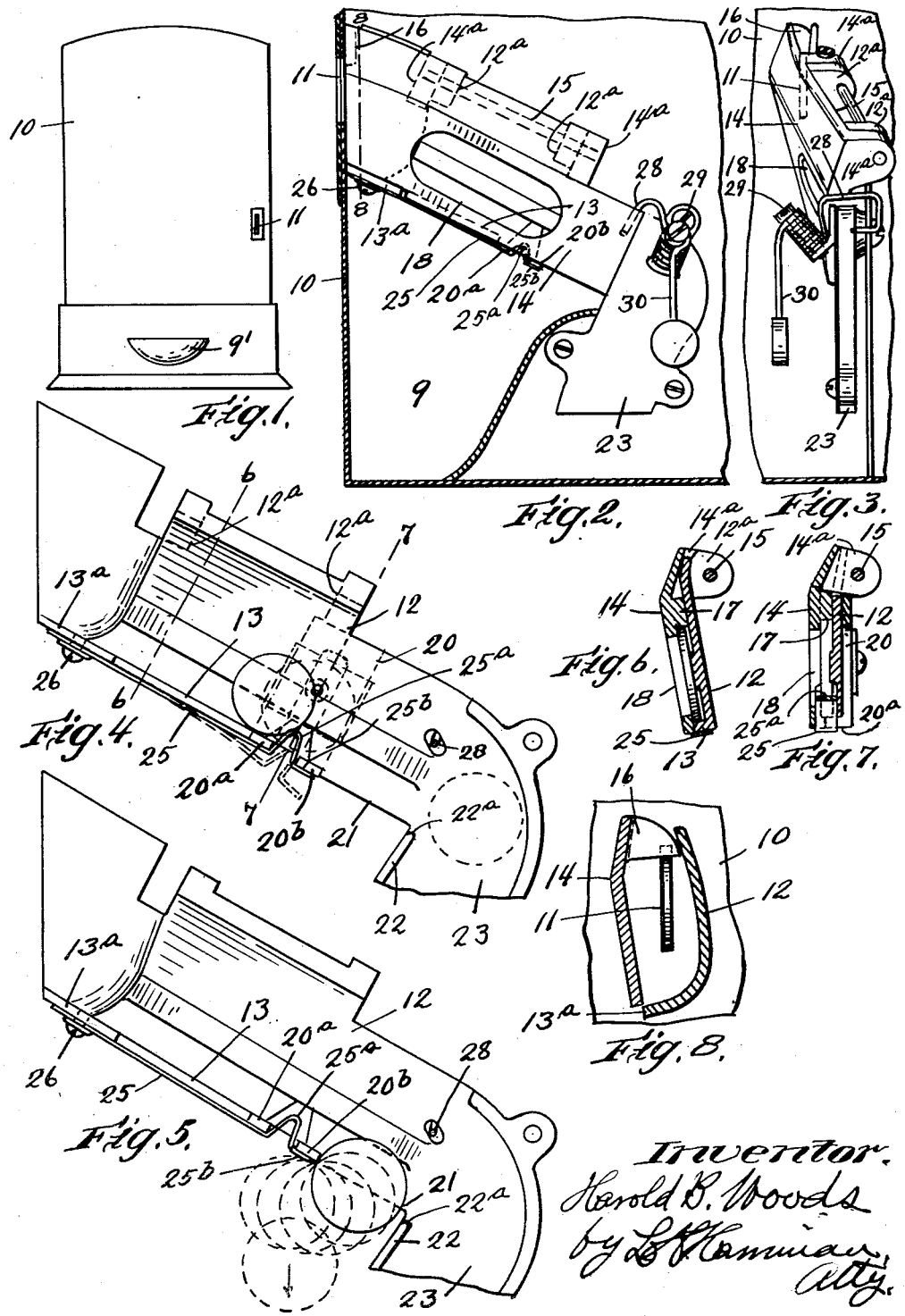
Inventor.
Harold B. Woods
by L. S. Hanniau,
Atty.

Patented Mar. 11, 1930

1,749,792

UNITED STATES PATENT OFFICE

HAROLD B. WOODS, OF ARLINGTON, MASSACHUSETTS, ASSIGNOR, BY MESNE ASSIGNMENTS, TO CONSOLIDATED AUTOMATIC MERCHANDISING CORPORATION, A CORPORATION OF DELAWARE

CHECK DETECTOR

Application filed February 5, 1927. Serial No. 166,045.

This invention relates to that class of mechanisms which are designed to test coins or circular checks as to their various physical characteristics, particularly, weight, diameter, thickness, and magnetism.

While apparatus which satisfactorily test coins in these particulars have been produced, so far as I am aware those which have operated most satisfactorily have been complicated and expensive to manufacture. Also much difficulty has been encountered in testing as to weight, and, in producing a satisfactory weight tester, the difficulties primarily have been not only to produce a mechanism which will reject a check which is very slightly under weight, over weight checks usually being rejected on account of being over size, but also to test a check without delaying its passage to the point where it releases the dispensing mechanism with which it is associated, such delay almost necessarily occuring when the weight is tested by a balancing operation.

In many of the States the laws require that coin-controlled machines return the check which is inserted, if the goods are not delivered, and in some instances where a magnet is employed to detect magnetic checks, difficulty has been encountered in stripping the check from the magnet, so that it will be returned immediately after it has been inserted, and, also, will not obstruct the coin passage, so as to prevent the next check which is inserted from passing therethru. Also certain mechanisms of the above character will operate satisfactorily when held in certain positions, but will not intercept a non-standard check when held in a different position, and, where a machine is not firmly secured to a base, there is a liability that it will be tilted so as to render the testing means inoperative.

The primary objects of my invention are to provide a detecting mechanism which will accurately test the checks which are inserted therein as to weight, particularly under weight, so that a slightly underweight check, of standard dimensions, will be intercepted and returned to the person inserting it, the weight testing operation to be performed without appreciably retarding the movement of the check thru the passage. Also to provide a mechanism of this character which employs a magnet for intercepting magnetic checks and which is arranged to strip an intercepted check from the magnet so that immediate return of the check is insured, and to provide means whereby all checks will be intercepted and returned if the mechanism is held in a position other than that intended.

Further objects are to provide a simplified construction which is comparatively inexpensive to manufacture and which will not require readjustment after long continued use.

I accomplish these objects in the manner hereinafter described and as illustrated in the accompanying drawing in which:

Fig. 1 is a front elevation of a casing for the mechanism.

Fig. 2 is a side elevation and Fig. 3 is an elevation of the inner end, of check detecting mechanism embodying my invention.

Figs. 4 and 5 are side elevation views thereof with one side of the check passage removed and Figs. 6 and 7 are sectional views at lines 6—6 and 7—7 respectively of Fig. 4.

Fig. 8 is a sectional view at line 8—8 of Fig. 2.

The outer casing 10 is provided with a coin entrance slot 11 which opens into the coin passage, the entrance portion of which is of the type in which the sides swing relatively to free the same of rejected checks. In the present instance the left-hand side 12 of the passage is fixed to the casing and the other side 14 is pivotally connected thereto by a pivot rod 15, which passes thru laterally projecting ears 14ª on side 14 and thru lugs 12ª on side 12, so that side 14 is suspended at its upper edge from the upper portion of side 12. At its outer end the coin passage is inclined slightly from the vertical in the direction of the side 14, while at the inner end it is practically vertical, as shown in Fig. 3. The pivot rod 15 is so located that the side 14 is held in position to rest against the side 12, so as to close the bottom of the passage by its gravity, as shown in Fig. 6, and said side 14 has a projection 16 which extends across the upper portion of the entrance slot 11, as shown in Fig. 8, so that when the check is pushed thru the slot the side 14 will be swung outward, and, if a previously inserted check has become lodged in the passage, or is retained therein by the detecting means hereinafter described, it will be dislodged therefrom and will fall thru the open bottom of the passage and be delivered to chamber 9 which conducts it to an open receptacle 9' from which it may be retrieved. In this connection it may be noted that means will also be provided whereby, when the operating means of the dispensing mechanism, in connection with which the detecting means is used, is actuated, the initial part of the movement will cause the swinging side 14 to be positively moved outward, so as to free it of any intercepted checks which may be therein, a short movement of the operating means being permitted before the locking means which is released by the coin becomes effective.

The coin passage is inclined downward from the front end thereof and its fixed side 12 is provided with a flange 13 at its lower edge against the edge of which the side 14 is held by its gravity, said flange forming a portion of the bottom of the coin passage, and being inclined downward and of slightly greater width than the standard thickness of the check which the mechanism is designed to receive. At the entrance to the passage the flange or bottom 13 is provided with an extension 13ª over which the side 14 swings and on which the check, when inserted, falls, the width of the extension being such that the side 14 will either not, at any time, be swung out beyond the end of the extension 13ª, or will swing back over it before the check reaches this point, so that the retention of the check in the passage is insured.

The side 14 is provided with a rib 17, the under side of which is parallel to the upper surface of flange 13, and is located at a distance therefrom approximately equal to the standard diameter of the check, so that a check of slightly greater diameter than standard will be intercepted thereby. Said side 14 is also provided with an opening 18, the upper edge of which is also parallel to the top side of flange 13, and the distance therebetween being such that a check of slightly less diameter than standard will fall thru the opening, as the check, by reason of the normally inclined position in which the upper portion of the side 14 is held, will lean against this side of the passage as it moves downward. A permanent magnet 20 is mounted on the side 12 and its poles 20ª, 20ᵇ are arranged at the lower end of the bottom flange 13, with their upper sides continuous with the upper surface thereof, so that, as the check rolls down the passage, it will roll over the poles of the magnet in contact therewith, but without substantial interruption of its movement, if it is nonmagnetic. An opening 21 is formed in the passage between the outer side of the second pole 20ᵇ which the check passes over and the nearly vertical side, or separating partition 22, of a coin passage 23, which conducts the coin to a point where it will unlock the dispensing means which it controls, the length of said opening being slightly greater than the diameter of any check which may be passed thru the entrance slot, but such that a standard check, on rolling down the passage, will acquire sufficient momentum to be carried across the opening, so that it will be accepted and pass into the passage 23. If, however, the check is magnetic, it will be sufficiently retarded to fall thru the opening 21, it will pass into chamber 9 and be returned to the one inserting it.

In connection with the above described construction, I provide a weight tester which consists of a flat spring 25, of nonmagnetic metal, which is secured by a screw 26 to the under side of the flange 13, at a point near the entrance end to the coin passage, said spring being thus normally held against the under surface of the flange and extending across the first pole 20ª of the magnet, at which point it is bent sharply at nearly right angles, so that it extends upwardly between the magnet poles and above the upper side of the flange 13, or bottom of the passsage, and then is bent reversely in U-form, forming a rounded abutment 25ª, and then is extended down between the poles and then at right-angles again, so that its end portion, 25ᵇ rests against the under side of pole 20ᵇ for nearly the entire width thereof. The spring 25 is of light weight metal and may be depressed from its normal position, shown in full lines, to the dotted line position of Fig. 4, by slight impact thereon, so that the abutment will be carried to the level or plane of the bottom of the passage. Under normal conditions, when a standard coin, of the denomination which the apparatus is designed to receive, is passed thru the entrance slot, it will roll rapidly down on the inclined bottom 13 of the passage, so that, when it reaches the magnet 20, it will have acquired a certain momentum. The U-shaped abutment 25ª projects into the path of the coin, as it rolls down the passage, so that it will be encountered thereby, and, if the check is of standard weight, and has not previously been intercepted by reason of being over or under standard diameter, it will strike abutment 25ª with a blow of sufficient force to throw the same down to such an extent that its rounded end will be carried down to the plane of the upper sides of the magnet poles 20ª 20ᵇ and will still have sufficient momentum to jump the opening 21 and pass into the passage 23. As the height of the downwardly inclined passage is uniform thruout its length, it will be necessary for the check to depress the abutment 25ª to the plane of the surface of the bottom of the passage before it can pass over the abutment. In practice, the tension of the spring 25 is carefully and accurately adjusted, so that, if the check is even very slightly underweight, it will not have acquired sufficient momentum to depress the spring sufficiently to permit it to pass the abutment, in which case it will be retained thereby, as indicated in Fig. 4 and will be rejected and returned when the side 14 is swung outward, the check being supported at a slight inclination by the portion of the side above the opening 18, so that, when the side 14 is swung away from side 12, the check will topple over and fall thru the opening 18 and into chamber 9. If the check should lodge on top of the abutment 25ª, and it should be attempted to dislodge it by jarring the machine, the check would either roll back onto the bottom of the passage, or drop thru the opening 21 into chamber 9. Also if the weight should be so close to standard that the check would pass over the spring, but if still slightly underweight, its speed might be reduced to such an extent that it would not have sufficient momentum to jump the opening 21 in the passage and would fall thru said opening. That is, in practice, the tension of the spring 25 may be so adjusted that any check of standard size, which is slightly under weight, as by reason, for example, of having a hole drilled in it, will either be intercepted by the abutment or will be retarded thereby sufficiently to prevent its entry into the passage 23. It will thus be apparent that the check will be accurately tested as to weight, but that the speed with which it is delivered to the passage 23 will not be retarded appreciably.

The end portion 25ᵇ of the spring acts as a stripper for the magnet 20 by reason of the fact that it is nonmagnetic and extends beneath the pole 20ᵇ at the upper end of opening 21, as under ordinary conditions, the momentum of a magnetic check will be so great that it will roll over the magnet poles and pass down the passage 21 while still held in contact therewith, as indicated in the dotted line positions in Fig. 5, and if the non-magnetic spring portion 25ᵇ were not present, it might remain suspended from the magnet, so that it would not be dislodged by the swinging movement of side 14. As said end portion extends nearly across the pole 20ᵇ, it will act to prevent the check from swinging into contact with the under side of the pole, at the corner of the latter, so that the momentum of the check will free it from the pole and it will fall into chamber 9.

It has been ascertained from experience that if the inclination of the passage between the sides 12 and 14 is continued to the entrance to passage 23, a check which is slightly underweight will engage the upper edge 22ª of the partition 22, which is made tapering or rounded as shown, and lodge thereon without falling either thru the opening 21 or into passage 23, the check being held balanced in this position by the frictional engagement of one side with the lower side of the passage against which it will rest under these conditions. To avoid this difficulty, the inclination of the passage is gradually lessened, as before described, from a point near the middle of the elongated opening 18 to the point of connection with the entrance to passage 23, at which point the sides of the passage are approximately vertical, so that when a check which is slightly underweight strikes on the rounded edge 22ª and tends to become balanced thereon, the frictional engagement against either side of the check by the sides of the passage will be reduced to practically nothing, so that the check will roll from the edge 22ª either into the passage 23 or back thru the opening 21, as it is practically impossible for a circular check to become balanced on a round, or knife edge, so that it will remain there without assistance.

By combining the weight testing spring 25 with the gap or opening 21 in the passage bottom, which the check must jump to pass into the receiving passage 23, the weight of the check may be tested with great accuracy, as the spring 25 may be so designed that the momentum of the standard coin will be just barely sufficient to carry it over the edge 22ª so that it will fall into the passage 23 and any slightly underweight check will fall back thru the opening 21. A coin weighing device of unusual precision is thus secured. It is also desirable to have the bottom of the passage between the sides 12 and 14 inclined downward sufficiently to give substantial acceleration to the check and to overcome the friction thereof with the side 14, and if the speed of the check were not very substantially retarded before it reached the gap, the latter would have to be made of considerable length to intercept a slightly underweight check.

It is also to be noted that, while the spring 25 may be considered primarily as a weight tester, on the assumption that a check of predetermined weight, when permitted to roll down a certain inclined surface for a certain distance, will acquire a certain momentum, the impact of which against a yieldable abutment, held in its path by a spring adjusted to a certain tension will be just sufficient to push the abutment aside so that the check may pass, yet the device may, under certain conditions act to test the check as to over size or under size, that is, if the diameter of the check should be slightly over size, so that it frictionally engaged the top of the passage but the friction was insufficient to cause the check to lodge, or, if it was slightly under size in diameter, so that it frictionally engaged the top side of the opening 18 without falling therethru, then the speed, and consequently the momentum of the check, at time of impact, would be reduced, so that the spring would intercept it. In other words, any condition of the check which acts to reduce its momentum at the time of impact with the testing device 25 will result in its rejection.

The somewhat helical form of the sides of the check passage from a point near the middle of the opening for rejecting checks which are under diameter, somewhat assists in the operation of the opening 18 in rejecting such checks, for the reason that the upper portion of the check will be pressed firmly against the side 14, by reason of the deflection of the check from the direction which it tends to move, to the upright position. The check is still held in an inclined position at the point where it engages the weight testing spring 25, so that, if it is intercepted by the latter, it will fall readily thru the opening 18, when the side 14 is moved slightly away from side 12.

As the operation of accurately testing the check as to weight depends on holding the passage leading to the tester at a certain inclination, it follows that if the machine were tilted upward, so as to increase this inclination, an under weight check, which would be intercepted under normal conditions, might acquire sufficient momentum to depress the spring 25 and pass over the separating partition 22 into passage 23. To avoid this possibility a normally inoperative, gravity actuated interceptor is provided, which becomes operative when the machine is moved from normal position, so that any check which is inserted will then be intercepted. This device comprises a wire finger 28 which is mounted to swing on a pivot 29, adjacent the entrance to the coin passage 23, and in oblique relation to the sides of the passage, said finger being bent right angularly at several points and having its end portion arranged to be be held in a normal position at one side of the passage by a weighted arm 30, which is connected to said finger, and suspended from the pivot 29.

With this construction, when the machine is sitting on a horizontal support, so that the check testing passage declines as intended, the weighted arm 30 holds the finger 28 in an inoperative position. If, however, the machine should be tilted backward, even to a slight degree, the end portion of finger 28 will immediately be moved so that it protrudes into the passage directly in front of the entrance to the coin receiving passage 23. As a result, whether the check which is inserted is standard or not, it will engage the finger 28 and be deflected into the slot opening 21, so that it will be immediately returned to the one inserting it.

I claim:

1. In a mechanism for testing the weight of a check, means providing a passage down which the check may move by its gravity to acquire momentum, the said passage being so formed as to provide a diminishing friction between the passage and the check, and an abutment normally supported in the path of movement of the check at a point at which it has acquired a suitable momentum and yieldable therefrom by the impact of the check thereagainst, to permit the check to pass the abutment or to be intercepted thereby according to the momentum of the check at the time of impact.

2. In a mechanism for testing circular checks, means having a passage, down which a check may move by its gravity, the said passage being so formed as to provide diminishing friction between the passage and the check, retarding a standard check a predetermined amount, so that a standard check will have acquired a predetermined momentum as it reaches a certain point therein, and an abutment normally yieldably supported at said point in the path of movement of the check and arranged to be moved out of said path by the impact of a check thereagainst when the check has acquired such momentum and otherwise to cause the check to be intercepted.

3. In a mechanism for testing circular checks, means providing a declining passage down which the checks may roll, to acquire a suitable momentum at a certain point therein, the said passage being so formed as to provide diminishing force of friction between the passage and the check to control the momentum of the check, an abutment normally held to project into the path of movement of the check at said point and yieldable therefrom by the impact of a check thereagainst, to permit a check which has acquired a certain momentum to pass the abutment and be accepted and to intercept or so reduce the speed of a check which has acquired a less momentum as to cause it to be rejected.

4. In a mechanism for testing the weight of circular checks, means providing a declining passage down which the check may roll, and an abutment normally held to project upwardly into the passage at its lower end, and yieldable by the impact and weight of the check thereagainst to permit the passage of a check which has acquired a certain momentum and yieldable insufficiently to permit the passage of a check having a less momentum.

5. In a mechanism for testing circular checks, means providing a declining passage down which the check may roll, so that a standard check will acquire a predetermined momentum at a certain point therein, and a spring actuated abutment held normally to project upwardly into said passage at said point in position to be struck by the check and to be moved downwardly out of the passage by the impact and weight of the check thereagainst, thereby to cause the check to be received or rejected according to whether its momentum at the time of impact equals or is less than the predetermined momentum.

6. In a mechanism for testing the weight of a flat, circular check, means providing a vertically disposed, downwardly inclined passage corresponding in height to the diameter and in width to the thickness of a standard check and down which the check may roll, and an abutment arranged to project upwardly into said passage in position to be engaged by the lower edge of the check when it has acquired a suitable momentum, said abutment being vertically yieldable downwardly out of the passage by the impact and weight of the check, to permit the check to pass the abutment or to be intercepted thereby according to its momentum at the time of impact.

7. In a mechanism for testing the weight of a flat, circular check, means providing a vertically disposed, downwardly inclined passage corresponding in height to the diameter and in width to the thickness of a standard check and down which the check may roll, and a spring sustained abutment arranged to project upwardly thru the bottom of the passage at its lower end and into position to be engaged by the edge of the check and downwardly yieldable by the impact of the check, to permit the check to pass the abutment or to be intercepted thereby according to its momentum at the time of impact.

8. In a mechanism for testing the weight of a circular check, means providing a vertically disposed, downwardly inclined passage of a height corresponding to the diameter of the check, down which it may roll to acquire a suitable momentum, a spring supported abutment arranged to project vertically upward into the passage for a substantial distance and having a rounded end portion for engagement by the check, said abutment being movable from the passage by the impact of the check thereagainst and the tension of the spring support thereof being arranged to yield sufficiently to permit the passage of a check which has acquired a certain momentum and insufficiently to intercept a check having less momentum.

9. In a mechanism for testing the weight of a circular check, means providing a vertically disposed, downwardly inclined passage of a height corresponding to the diameter of the check, down which it may roll to acquire a suitable momentum, and a spring arm supported at one end and having a projection at its opposite end arranged to extend vertically upward into the passage, the tension of said arm being designed to permit said projection to be forced from the passage by the impact of a check thereagainst when it has acquired a certain momentum and to intercept a check having less momentum.

10. In a mechanism for testing the weight of a circular check, means providing a vertically disposed, downwardly inclined passage of a height corresponding to the diameter of the check, down which it may roll to acquire a suitable momentum, a spring arm supported at one end and extending beneath the passage, and an abutment on the opposite end of said arm arranged to extend through the bottom of the passage and having a rounded end portion normally supported by said arm in position to be engaged by the check as it rolls down the passage, the tension of said arm being designed to permit a check having a certain momentum to force the abutment from the passage, so that it may pass the same, and to intercept a check having less momentum.

11. In a mechanism for testing a circular check, means providing a vertically disposed check passage arranged to decline from its receiving end and having an opening in its bottom at its lower end thru which the check may pass to reject the same, fixed separating means at the end of said opening opposite the passage, beyond which the check must pass to be accepted and a spring supported abutment normally held to project vertically upward into the passage adjacent the opposite end of said opening in position to be engaged by the check as it rolls down the passage and to be forced from the passage against the spring action by the impact of the check thereagainst, the tension of said spring action being such that a check having a certain momentum at the time of engagement with said abutment will move the latter aside, and will jump the opening and pass said separating means, while a check having less momentum will either fall thru the opening or be intercepted by said abutment.

12. In a mechanism for testing a circular check, means providing a vertically disposed check passage arranged to decline from its receiving end and having an opening in its bottom at its lower end thru which the check may pass to reject the same, fixed separating means at the end of said opening opposite the passage, beyond which the check must pass to be accepted, and a spring supported abutment normally held to project thru the bottom of the passage adjacent the opposite end of said opening in position to be engaged by the check as it rolls down the passage and to be forced downwardly against said spring action by the impact of the check thereagainst, whereby, a check having a certain momentum at the time of impact will push down the abutment and be carried over the opening and beyond said separating means and the speed of one having a less momentum will be arrested by the abutment, so that it will fall thru the opening or will be retained by the abutment for subsequent rejection.

13. In a mechanism for testing a circular check, means providing a vertically disposed check passage arranged to decline from its receiving end, a magnet having its poles arranged at the level of the bottom of the passage adjacent its lower end, so that the check will roll in contact therewith as it passes the same, an abutment spring supported beneath the magnet poles and extending upward between them above the level of their upper sides and in position to be engaged by the check and to yield by the impact thereof, thereby to retard the passage of the check over the magnet poles.

14. In a mechanism for testing a circular check, means providing a vertically disposed check passage arranged to decline from its receiving end and having an opening in its bottom at its lower end thru which the check may pass to reject the same, fixed separating means at the end of said opening opposite the passage, beyond which the check must pass to be accepted, a magnet supported with its poles at the level of the bottom of the passage, one of said poles having a non-magnetic shield on its under side and forming the end of the opening opposite said separating means and a spring supported, non-magnetic abutment extending upward into said passage between the magnet poles and in position to be engaged by a check rolling down the passage, thereby to retard or intercept the passage of the check and cause its rejection or reception according to its momentum at the time of impact with the abutment.

15. In a machine for testing a circular check, a casing having a check passage therein, the bottom of which is inclined downward from the entrance thereto and the sides of which are laterally inclined from the vertical adjacent the entrance and are reduced in inclination to an approximately vertical position at the discharge end, check-rejecting means associated with the laterally inclined portions of the sides, and a separating partition at the discharge end of the passage over which the check must pass to be accepted, the bottom of the passage having a check rejecting opening adjacent said partition over which the check must be carried by its momentum to pass said partition.

16. In a machine for testing a circular check, a casing having a check passage therein, the bottom of which is inclined downward from the entrance thereto and the sides of which are laterally inclined from the vertical adjacent the entrance and are reduced in inclination to an approximately vertical position at the delivery end, check-rejecting means associated with the laterally inclined portions of the sides, and a separating partition at the discharge end of the passage having a tapering upper edge over which the check must pass to be accepted, the bottom of said passage having a check rejecting opening therein extending to the side of said partition and over which the check must be carried by its momentum to pass over the partition.

17. In a mechanism for testing a circular check, a casing having a declining passage down which the check may roll to acquire momentum, an abutment normally yieldably supported in the passage and arranged to be engaged and moved aside by a check having a certain momentum at the time of impact therewith, to permit its acceptance, and to cause the rejection of a check having less momentum, and an intercepting finger having gravity actuated means arranged to hold the same at one side of the passage when the casing is in normal position and to move the finger into the passage to intercept the checks passing down the same when the casing is moved to increase the downward inclination of the passage.

18. In a mechanism for testing a circular check, a casing having a declining passage down which the check may roll to acquire momentum, said passage having a check rejecting opening in its bottom over which the check must be carried by its momentum to be accepted, and gravity actuated intercepting means arranged to be held in an inoperative position, when the casing is held in its normal position and automatically movable into a position to intercept a check inserted in the passage and cause it to fall thru said opening when the casing is moved to increase the inclination of the passage.

19. In a mechanism for testing a circular check, a casing having a declining passage down which the check may roll to acquire momentum, said passage having a check rejecting opening in its bottom over which the check must be carried by its momentum to be accepted, and a finger having gravity actuated means arranged normally to hold the same at one side of the path of movement of the check, as it moves thru said passage, and to move it into said path at a point to deflect the check thru said opening when the casing is moved to increase the inclination of the passage.

20. In a mechanism for testing a circular check, a check passage, a magnet placed adjacent said passage to test checks for their magnetic properties, a weight and size testing device so placed in the said passage as to strip any checks off the magnet that adhere thereto.

In testimony whereof, I have signed my name to this specification.

HAROLD B. WOODS.